E. H. STAFFORD.
COMBINED SEAT AND DESK.
APPLICATION FILED AUG. 23, 1915.
1,303,981.
Patented May 20, 1919.
2 SHEETS—SHEET 1.
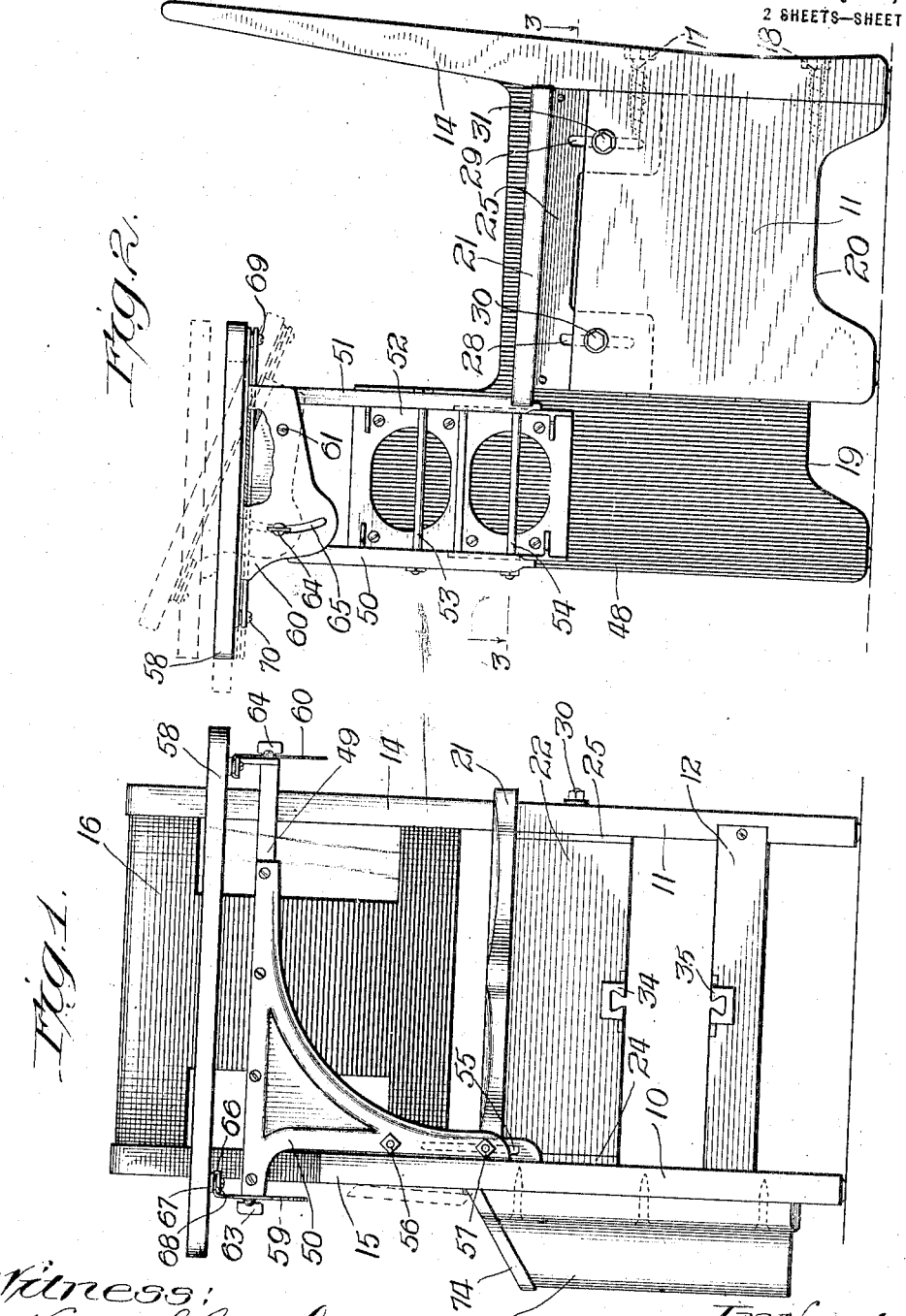
Witness:
Harry S. Gaither
Inventor
Egbert H. Stafford
by Gillson & Gillson
Attys

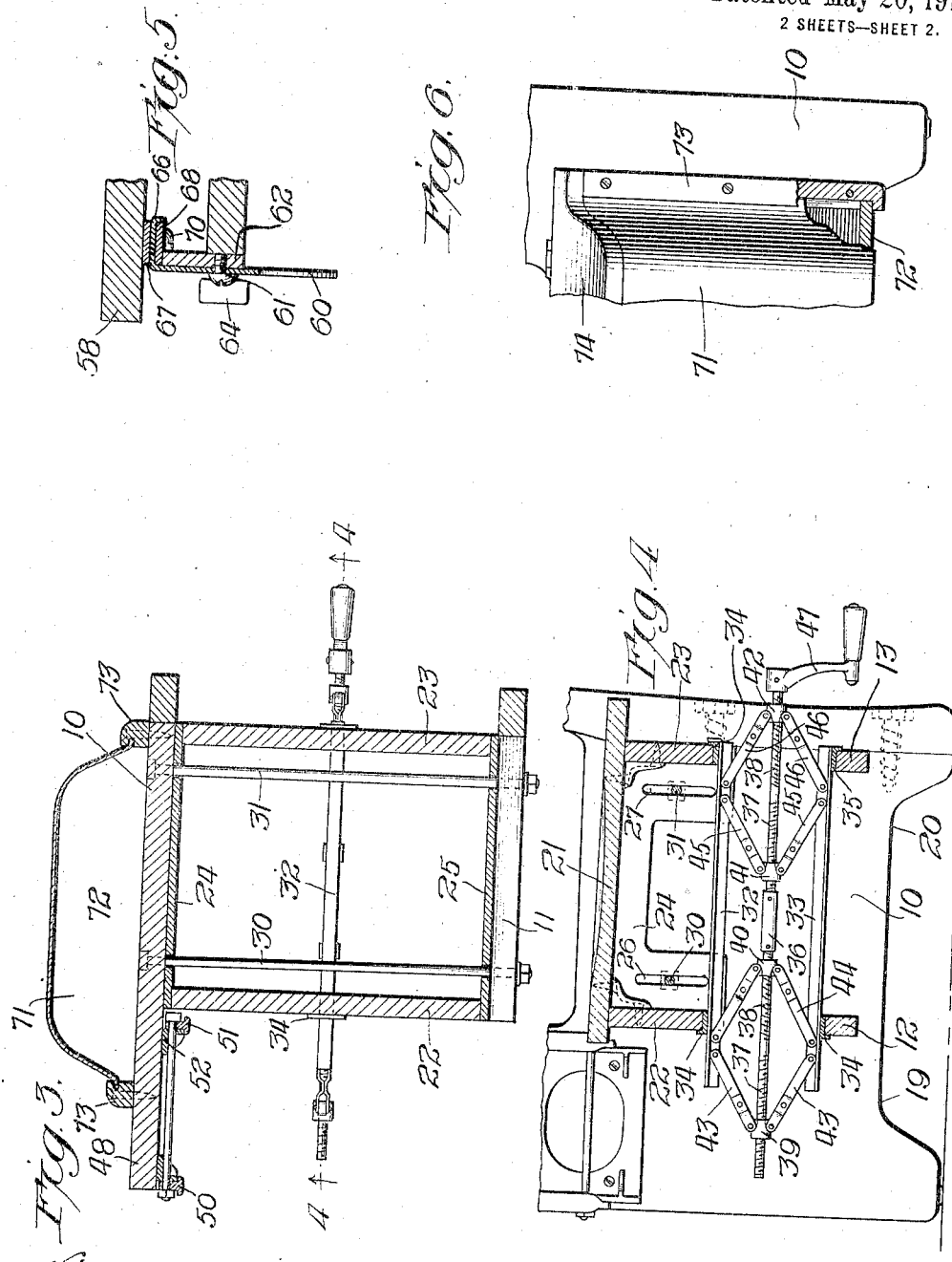

UNITED STATES PATENT OFFICE.

EZRA H. STAFFORD, OF GLENCOE, ILLINOIS, ASSIGNOR TO E. H. STAFFORD MANUFACTURING CO., OF CHICAGO, ILLINOIS, A CORPORATION OF ILLINOIS.

COMBINED SEAT AND DESK.

1,303,981.  Specification of Letters Patent.  Patented May 20, 1919.

Application filed August 23, 1915. Serial No. 46,829.

*To all whom it may concern:*

Be it known that I, EZRA H. STAFFORD, a citizen of the United States, and resident of Glencoe, county of Cook, and State of Illinois, have invented certain new and useful Improvements in Combined Seats and Desks, of which the following is a specification, and which are illustrated in the accompanying drawings, forming a part thereof.

The invention relates to combined seats and desks especially adapted for school purposes. The objects of the invention are to provide a portable structure which is adjustable to accommodate pupils varying in size; to provide for the easy assembling and disassembling of the parts, and for securely holding them when assembled and adjusted; and to improve such devices in various details.

One embodiment of the invention is hereinafter described, and is illustrated in the accompanying drawings in which —

Figure 1 is a front elevation of the device;

Fig. 2 is a side elevation thereof showing different positions of the desk in dotted lines;

Fig. 3 is a plan section on the line 3—3 of Fig. 2;

Fig. 4 is a detail vertical central section on the line 4—4 of Fig. 3;

Fig. 5 is a sectional detail of the adjustable desk support; and

Fig. 6 is a detail, partly in section, of the side of the seat showing a book receptacle.

The seat comprises a suitable frame having side members 10, 11, and cross members 12, 13; and a back which comprises the uprights 14, 15, and a panel portion 16. The back is secured to the side members of the frame by means of screw-bolts, such as those shown at 17, 18, which are readily removable. The sides 10 and 11 are continuous structures, though preferably are coved out at the bottom, as indicated at 19, 20, providing front and back feet.

The bottom 21 of the seat is provided with depending front and back cross-members 22, 23, and with side plates 24, 25, preferably of metal, and spaced to loosely enter between the frame members 10, 11. These plates are vertically slotted, as shown at 26, 27, 28, 29, to receive tie-rods 30, 31, which set through the side members 10, 11, of the frame and are provided with suitable nuts. The bottom is, therefore, vertically adjustable, and is rigidly secured in any adjusted position by means of the tie-rods.

In order to provide for vertically adjusting the bottom while maintaining its proper inclination, there is shown a removable raising and lowering apparatus comprising a pair of parallel bars 32, 33, adapted to fit in apertured plates 34, 35, secured, respectively, to the cross-members 22, 23, of the bottom and the cross-bars 12, 13, of the frame; a rod 36 having at each end right and left screw threads, as shown at 37, 38, upon which run nuts 39, 40, 41 and 42, each of which is connected, by means of a pair of links 43, 44, 45 and 46, with the bars 32, 33, thereby forming two double toggles. A crank arm 47 is fixed to the rear end of the rod 36. The nuts on the tie-rods 30, 31, being loosened, the seat bottom may be raised and lowered with a parallel motion by turning the crank 47. The nuts on the rods 30, 31, being tightened, the raising and lowering device may be removed from the seat in order that it will not be in the way of the user.

The side wall 10 of the frame is forwardly extended, as shown at 48, and is extended upwardly above the seat bottom and supports the desk.

The desk comprises a bracket 49, formed of a pair of side plates 50, 51, which are secured to instanding flanges of a plate 52 attached to the upwardly projecting portion of the wall extension 48, this attachment being by means of a pair of bolts 53, 54, which pass through slots, as 55, in the flanges of the plate 52, and are provided with suitable nuts, as shown at 56, 57,—thus permitting the raising and lowering of the side plates and providing for rigidly securing them in their adjusted positions. The desk comprises further a table 58 provided with a pair of depending plates 59, 60, which are pivoted, as shown at 61, to the cross members, as 62, of the bracket 49 adjacent their rearward ends, and are secured to such cross members at their forward ends by means of winged nuts 63, 64, engaging studs fixed in the end members of the bracket and setting through curved slots, as 65, in the plates 59, 60. The table may, therefore, be tilted upwardly at its forward end to give it such inclination as the user may prefer, and may be locked in its adjusted position by means of the nuts 63, 64.

The plates 59, 60, are flanged inwardly at their upper edges, as shown at 66, each of these flanges fitting between a pair of plates 67, 68, secured to the under face of the table by means of screws 69, 70, adjacent their ends. The plates, 67, 68, being of greater length than the flanges 66, the table may be adjusted horizontally and, if desired, may be firmly secured in any adjusted position by tightening up the screws 69, 70.

The table, therefore, has three adjustments,—vertically by reason of the sliding engagement of the supporting bracket with the side of the seat; it may be tilted about the pivots 61; and it may be moved backwardly and forwardly between the guide plates 67, 68. The desk may be readily removed from the seat by withdrawing the bolts 53, 54, and the several members of the table may be disconnected from each other and from the bracket.

A book receptacle 71 is attached to one of the side walls of the seat frame, and comprises an outwardly bowed body portion which may be of metal or of wood and having a bottom 72. The edges of the body portion of the box slide vertically in ways 73 attached to the side wall of the seat frame. The top of the box is covered by means of a lid 74, hinged to the seat frame, and when raised permitting the body portion of the box to be drawn out of the slideways.

The device as shown and described does not require to be attached to the floor, and may therefore be readily moved to clear the floor for calisthenics or other school exercises. It may be adjusted in several ways to suit the size and convenience of the occupant. It is easily assembled and disassembled, thereby facilitating and cheapening shipment and storage.

While I have shown and described a preferred embodiment of the invention, various changes may be made therein without departing from its scope.

I claim as my invention—

1. In a combined seat and desk, in combination, a frame comprising a pair of side walls and a back, one of the side walls being forwardly extended, a bottom vertically adjustable on the frame, a desk carried by the forward extension of the frame side and being vertically adjustable.

2. In a combined seat and desk, in combination, a frame comprising a pair of side walls and a back, one of the side walls being forwardly extended, a bottom vertically adjustable on the frame, a desk carried by the forward extension of the frame side and being vertically adjustable and having a tiltable table.

3. In a combined seat and desk, in combination, a frame comprising a pair of side walls and a back, one of the side walls being forwardly extended, a bottom vertically adjustable on the frame, a desk carried by the forward extension of the frame side and being vertically and horizontally adjustable and having a tiltable table.

4. In a combined seat and desk, in combination, a frame comprising a pair of side walls and a back, one of the side walls being forwardly extended, a bracket attached to such extension and being vertically adjustable, a table carried by the bracket and being forwardly and backwardly adjustable thereon.

5. In a combined seat and desk, in combination, a frame comprising a pair of side walls and a back, one of the side walls being forwardly extended, a plate attached to the extension and having vertically slotted flanges, a bracket having flanges slidably engaging the slotted flanges, bolts for securing the two sets of flanges together, and a table carried by the bracket.

6. In a combined seat and desk, in combination, a frame comprising a pair of side walls and a back, one of the side walls being forwardly extended, a bracket attached to such extension and being vertically adjustable, a table having two pairs of straps attached to its under face, plates having lateral flanges slidably fitting between the straps, such plates being attached to the bracket.

7. In a combined seat and desk, in combination, a frame comprising a pair of side walls and a back, one of the side walls being forwardly extended, a bracket attached to such extension and being vertically adjustable, a table having two pairs of straps attached to its under face, plates having lateral flanges slidably fitting between the straps, such plates being pivotally attached to the bracket and being slotted concentric with the pivots, and locking studs in the bracket and extending through the slots.

EZRA H. STAFFORD.